US009363589B2

(12) United States Patent
Lippert et al.

(10) Patent No.: US 9,363,589 B2
(45) Date of Patent: Jun. 7, 2016

(54) LIQUID RESISTANT ACOUSTIC DEVICE

(71) Applicant: Apple Inc., Cupertino, CA (US)

(72) Inventors: Jesse A. Lippert, Cupertino, CA (US); Anthony S. Montevirgen, Cupertino, CA (US); Brad G. Boozer, Cupertino, CA (US); Nikolas T. Vitt, Cupertino, CA (US); Rex T. Ehman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/448,387

(22) Filed: Jul. 31, 2014

(65) Prior Publication Data

US 2016/0037243 A1     Feb. 4, 2016

(51) Int. Cl.
*H04R 1/02* (2006.01)
*H04R 1/08* (2006.01)

(52) U.S. Cl.
CPC ................ *H04R 1/023* (2013.01); *H04R 1/086* (2013.01); *H04R 2201/029* (2013.01); *H04R 2499/11* (2013.01)

(58) Field of Classification Search
CPC .......... H04R 1/023; H04R 1/086; H04R 1/12; H04R 1/2823; H04R 1/2826; H04R 1/2876; H04R 1/288; H04R 2201/029; H04R 2499/11; H04R 2400/11; H04R 2460/11
See application file for complete search history.

(56) References Cited

U.S. PATENT DOCUMENTS 3,987,258 A * 10/1976 Tsutsui .................. H04R 1/021
                                                       181/149
5,349,140 A *  9/1994 Valenzin ................ H04R 1/086
                                                       181/158

(Continued)

FOREIGN PATENT DOCUMENTS

CN         1933679        3/2007
JP       2004312156      11/2004

(Continued)

OTHER PUBLICATIONS

Consumerist, "Cellphone Battery Designed to Fail At First Drop of Water?" Consumerist, Sep. 22, 2007, XP055199652, Retrieved from the Internet: URL:http://consumerist.com/2007/09/22/cellphone-battery-designed-to-fail-at-first-drop-of-water/ [retrieved on Jul. 2, 2015], 4 pages.

(Continued)

*Primary Examiner* — Curtis Kuntz
*Assistant Examiner* — Joshua Kaufman
(74) *Attorney, Agent, or Firm* — Brownstein Hyatt Farber Schreck, LLP

(57) ABSTRACT

An acoustic port of acoustic device is covered with a mesh and/or other structure that resists entry of liquid and/or other materials into the acoustic device. Apertures of a housing that are separated by an umbrella section are coupled to the acoustic port such that the umbrella section may cover the acoustic port. In this way, when liquid enters one or more of the apertures, the umbrella section may direct the liquid away from the mesh such that pressure from the liquid upon the mesh may be reduced. As such, potential damage to the mesh and/or internal acoustic device components may be mitigated. In some implementations, the apertures may be covered with an additional mesh. Such additional mesh may further reduce the pressure of entering liquid on the mesh covering the acoustic port of the acoustic device.

19 Claims, 7 Drawing Sheets

(56) References Cited

U.S. PATENT DOCUMENTS

| | | | |
|---|---|---|---|
| 6,064,909 A | 5/2000 | Barkley et al. | |
| 6,128,394 A * | 10/2000 | Hayakawa | H04R 1/023 181/149 |
| 6,486,398 B1 * | 11/2002 | McCulloch | B60R 16/0222 174/539 |
| 6,785,395 B1 * | 8/2004 | Arneson | H04M 1/03 379/432 |
| 6,899,794 B1 * | 5/2005 | Yamada | D21J 7/00 162/219 |
| 6,932,187 B2 | 8/2005 | Banter et al. | |
| 7,245,733 B2 * | 7/2007 | Saltykov | H04R 25/402 381/322 |
| 7,463,746 B2 * | 12/2008 | Caron | H04R 1/345 191/155 |
| 7,499,561 B2 | 3/2009 | Hanses et al. | |
| 7,577,345 B2 | 8/2009 | Tei et al. | |
| 7,876,919 B2 | 1/2011 | Ram et al. | |
| 7,894,621 B2 | 2/2011 | Jensen | |
| 8,055,003 B2 * | 11/2011 | Mittleman | H04M 1/035 381/345 |
| 8,059,490 B2 | 11/2011 | Rapps et al. | |
| 8,112,130 B2 | 2/2012 | Mittleman et al. | |
| 8,135,149 B2 | 3/2012 | Yoshida et al. | |
| 8,157,048 B2 * | 4/2012 | Banter | H04R 1/023 181/149 |
| 8,175,321 B2 | 5/2012 | Bryant et al. | |
| 8,185,166 B2 | 5/2012 | Weber et al. | |
| 8,229,153 B2 | 7/2012 | Mittleman et al. | |
| 8,272,517 B2 | 9/2012 | Horie et al. | |
| 8,416,089 B1 | 4/2013 | Clary | |
| 8,644,530 B2 | 2/2014 | Soininen et al. | |
| 8,670,586 B1 * | 3/2014 | Boyle | H04R 1/1008 381/189 |
| 8,687,828 B2 | 4/2014 | Otani et al. | |
| 8,724,841 B2 | 5/2014 | Bright et al. | |
| 8,803,745 B2 * | 8/2014 | Dabov | H01Q 7/00 343/702 |
| 8,811,634 B2 | 8/2014 | Kaplan et al. | |
| 8,883,289 B2 | 11/2014 | Tsao et al. | |
| 8,923,528 B2 | 12/2014 | Arche | |
| 8,939,252 B2 * | 1/2015 | Sanborn | H04R 1/023 181/199 |
| 8,942,401 B2 | 1/2015 | Murayama | |
| 8,965,030 B2 | 2/2015 | Aase | |
| 8,986,802 B2 | 3/2015 | Karube et al. | |
| 9,038,773 B2 | 5/2015 | Banter | |
| 9,171,535 B2 | 10/2015 | Abe et al. | |
| 2004/0029530 A1 | 2/2004 | Noguchi et al. | |
| 2005/0077102 A1 * | 4/2005 | Banter | H04R 1/086 181/149 |
| 2005/0134473 A1 | 6/2005 | Jang et al. | |
| 2006/0198547 A1 * | 9/2006 | Hampton | H04R 1/023 381/395 |
| 2007/0003081 A1 | 1/2007 | Ram et al. | |
| 2007/0035865 A1 | 2/2007 | Chashi | |
| 2007/0053538 A1 * | 3/2007 | Jensen | H04R 1/086 381/359 |
| 2007/0113964 A1 | 5/2007 | Crawford et al. | |
| 2007/0263878 A1 * | 11/2007 | Yu | H04R 1/26 381/73.1 |
| 2008/0149417 A1 * | 6/2008 | Dinh | H04M 1/03 181/145 |
| 2009/0230487 A1 * | 9/2009 | Saitoh | B81B 7/0061 257/419 |
| 2009/0245564 A1 * | 10/2009 | Mittleman | H04M 1/035 381/361 |
| 2009/0245565 A1 * | 10/2009 | Mittleman | H04M 1/035 381/365 |
| 2009/0247244 A1 * | 10/2009 | Mittleman | H04M 1/035 455/575.1 |
| 2010/0092022 A1 * | 4/2010 | Hopkinson | H04R 1/023 381/391 |
| 2010/0103612 A1 * | 4/2010 | Weber | H05K 5/0247 361/679.56 |
| 2010/0270102 A1 * | 10/2010 | Banter | H04R 1/023 181/198 |
| 2011/0013799 A1 * | 1/2011 | Fang | H04R 1/086 381/355 |
| 2011/0182452 A1 * | 7/2011 | Lin | H04R 25/658 381/325 |
| 2011/0255728 A1 | 10/2011 | Abe et al. | |
| 2012/0134518 A1 * | 5/2012 | Otani | H04R 1/023 381/189 |
| 2012/0177239 A1 * | 7/2012 | Lee | H04R 1/086 381/359 |
| 2012/0195455 A1 | 8/2012 | Chiba et al. | |
| 2013/0083957 A1 * | 4/2013 | Soininen | H04R 1/02 381/391 |
| 2013/0156985 A1 * | 6/2013 | Karube | B32B 7/06 428/41.8 |
| 2013/0170109 A1 * | 7/2013 | Cohen | H04M 1/03 361/679.01 |
| 2013/0287213 A1 | 10/2013 | Sekiyama | |
| 2013/0296994 A1 | 11/2013 | Vaishya | |
| 2013/0333978 A1 * | 12/2013 | Abe | G10K 11/002 181/291 |
| 2014/0044297 A1 * | 2/2014 | Loeppert | H04R 1/04 381/355 |
| 2014/0048351 A1 * | 2/2014 | Banter | G10K 11/002 181/286 |
| 2014/0064542 A1 * | 3/2014 | Bright | H04R 1/086 381/359 |
| 2014/0064546 A1 | 3/2014 | Szczech | |
| 2014/0083296 A1 | 3/2014 | Sanders | |
| 2014/0093095 A1 * | 4/2014 | Slotte | H04R 1/02 381/87 |
| 2014/0219646 A1 * | 8/2014 | Hooton | G03B 15/03 396/176 |
| 2014/0254849 A1 * | 9/2014 | Abe | H04R 1/086 381/334 |
| 2015/0016648 A1 | 1/2015 | Kazemzadeh et al. | |
| 2015/0146905 A1 * | 5/2015 | Abe | H04R 1/086 381/334 |
| 2015/0163572 A1 * | 6/2015 | Weiss | H04R 1/02 381/337 |
| 2015/0237431 A1 * | 8/2015 | Jeziorek | H04R 1/04 381/361 |
| 2015/0304767 A1 * | 10/2015 | Mori | H04M 1/03 381/334 |
| 2015/0319534 A1 | 11/2015 | Lippert et al. | |

FOREIGN PATENT DOCUMENTS

| | | |
|---|---|---|
| JP | 2011188191 | 9/2011 |
| JP | 2013115549 | 6/2013 |
| WO | WO 2015/047378 | 4/2015 |

OTHER PUBLICATIONS

The Gadget Show, "What to do when gadgets get wet," Retrieved from the Internet: URL:http://gadgetshow.channel5.com/gadget-show/blog/what-to-do-when-gadgets-get-wet [retrieved on Apr. 9, 2014], p. 2, paragraph 1, 2 pages.

International Search Report and Written Opinion dated Oct. 12, 2015, PCT/US2015/041106, 14 pages.

Evaluation Report dated Mar. 8, 2016, CN ZL201520692403.7, 18 pages.

\* cited by examiner

LIQUID RESISTANT ACOUSTIC DEVICE

TECHNICAL FIELD

This disclosure relates generally to acoustic devices, and more specifically to liquid resistant acoustic devices.

BACKGROUND

Acoustic devices, such as microphones and speakers, typically project sound waves through an acoustic port that is coupled to an aperture in a housing to produce sound and/or receive sound waves through such an acoustic port to detect sound. In some cases, the acoustic port may be protected by a mesh or other structure that resists entry of dust, liquid, and/or other materials into the acoustic device.

However, there may be limits on the resistivity to entry of such materials that the mesh can provide. The more that the mesh resists entry of such materials, the more that the mesh may interfere with the passage of sound waves, potentially hindering operation of the acoustic device.

In particular, liquid that enters the aperture in the housing may exert pressure upon the mesh or other structure. The mesh may be able to be configured to resist entry of the liquid in the absence of such pressure without significantly impairing the passage of sound waves, but may not be able to be configured to resist the pressure without impairing the passage of sound waves. As a result, such pressure may tear and/or otherwise damage the mesh. Additionally, such tearing or damage of the mesh may enable the liquid and/or other material to enter the acoustic device and damage sensitive components.

SUMMARY

The present disclosure discloses systems, method, and apparatuses for a liquid resistant acoustic device. An acoustic port of acoustic device may be covered with a mesh and/or other structure that resists entry of liquid and/or other materials into the acoustic device. Apertures of a housing that may be separated by an umbrella section may be coupled to the acoustic port such that the umbrella section may cover the acoustic port. In this way, when liquid enters one or more of the apertures, the umbrella section may direct the liquid away from the mesh such that pressure from the liquid upon the mesh may be reduced. As such, potential damage to the mesh and/or internal acoustic device components may be mitigated.

In some cases, the umbrella section may be wider than the acoustic port in order to cover area occupied by the acoustic port completely. In various cases, the distance between the apertures of the housing may be sufficient that surface tension of liquid positioned between the apertures and the mesh on the acoustic port does not trap the liquid in place. As such, the distance between the apertures may allow liquid that enters the apertures to exit and/or not prevent the liquid from exiting.

In some implementations, the mesh may resist the passage of liquid absent pressure but may pass liquid under pressure and/or under sufficient pressure. In various implementations, the mesh may be formed of a sheet of material with multiple perforations that are oriented in a number of different directions. Such perforations may be formed by laser perforation and/or other suitable processes. In various implementations, one or more hydrophobic and/or hydrophilic coatings may be located on a variety of different surfaces. In one or more implementations, an additional mesh may cover the apertures.

In some implementations, the acoustic device may be configured such that an acoustic membrane of the acoustic device is oriented toward the acoustic port, and thusly oriented toward the mesh and the umbrella section as well. Such an orientation may aid the acoustic device in driving out liquid that enters the apertures, such as by producing one or more tones using the acoustic membrane and/or by various other techniques.

In various embodiments, a system for a liquid resistant acoustic device may include an acoustic device that has an acoustic port and a structure covering the acoustic port that resists entry of liquid or other materials into the acoustic device and a housing that has an umbrella housing section and at least two apertures separated by the umbrella housing section that couple to the acoustic port of the acoustic device. The umbrella housing section may cover the acoustic port.

In some embodiments, an electronic device includes an acoustic device having an acoustic port and a structure that resists entry of liquid or other materials into the acoustic device positioned over the acoustic port and a housing having an umbrella section and at least two openings separated by the umbrella section that couple to the acoustic port of the acoustic device. The umbrella section may cover the acoustic port.

In one or more embodiments, a method for assembling a liquid resistant acoustic device includes: positioning a structure over an acoustic port of an acoustic device that resists entry of liquid or other materials into the acoustic device; coupling the acoustic port to at least two apertures of a housing that are separated by an umbrella section; and covering the acoustic port with the umbrella section.

In various embodiments, a method for operating a liquid resistant acoustic device includes receiving liquid through apertures or openings of a housing that are separated by an umbrella section and coupled to an acoustic port of an acoustic device; and directing the flow of the liquid through the apertures or openings away from a portion of structure covering the acoustic port that resists entry of liquid or other materials into the acoustic device and/or the acoustic port utilizing the umbrella section.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
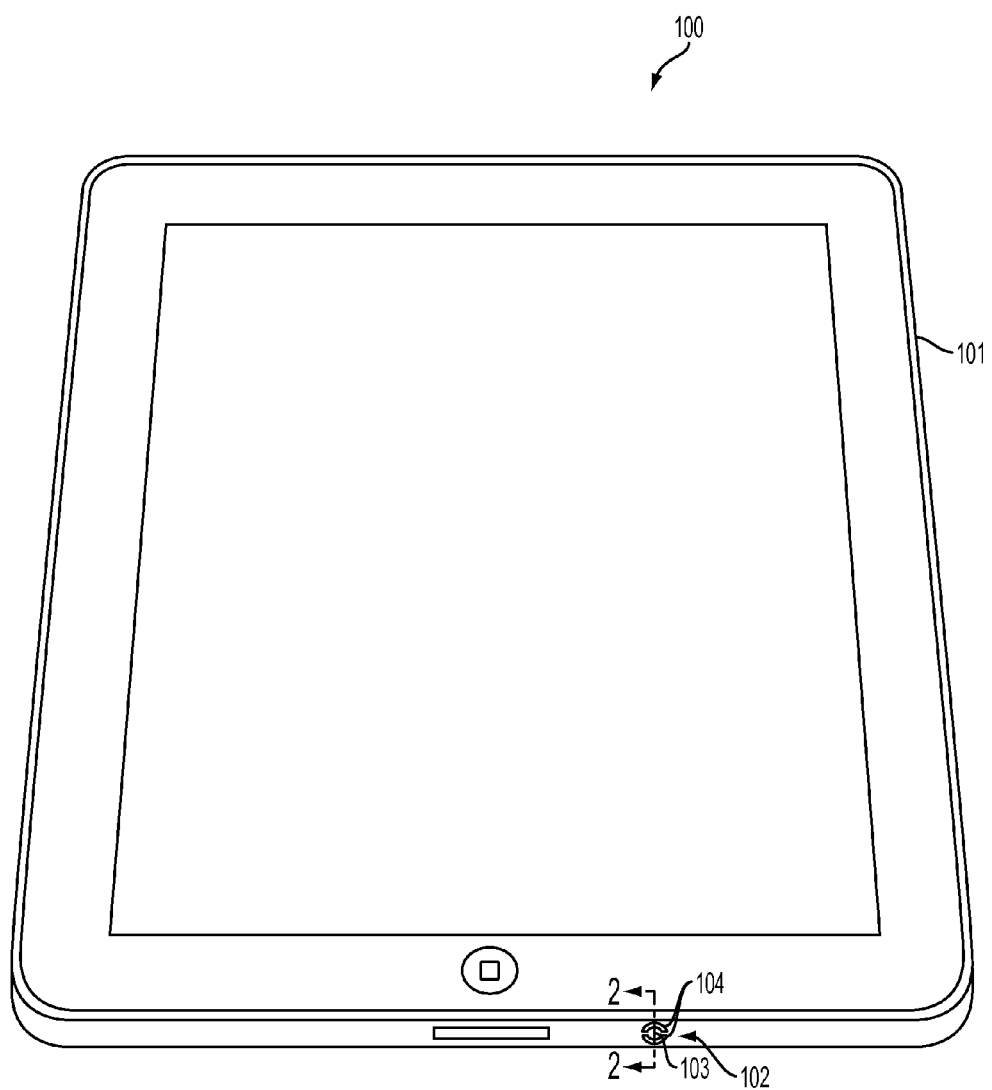
FIG. 1 is an isometric view illustrating an example system for a liquid resistant acoustic device.

The description that follows includes sample systems, methods, and apparatuses that embody various elements of the present disclosure. However, it should be understood that the described disclosure may be practiced in a variety of forms in addition to those described herein.

The present disclosure discloses systems, method, and apparatuses for a liquid resistant acoustic device. An acoustic port of acoustic device (such as a microphone, a speaker, a microelectromechanical systems (MEMS) microphone, a MEMS speaker, and/or any other acoustic device) may be covered with a mesh and/or other structure that resists entry of liquid and/or other materials into the acoustic device (in the present disclosure, any mesh or use of the term "mesh" means any structure that resists entry of liquid or other materials into the acoustic device). Apertures of a housing that may be separated by an "umbrella section" (named as such because of the covering function it performs) may be coupled to the acoustic port such that the umbrella section may cover the acoustic port. In this way, when liquid (such as water) enters one or more of the apertures, the umbrella section may direct the liquid away from the mesh such that pressure from the liquid upon the mesh may be reduced. As such, potential damage to the mesh and/or internal acoustic device components may be mitigated.

In some cases, the umbrella section may be wider than the acoustic port in order to cover area occupied by the acoustic port completely. In various cases, the distance between the apertures of the housing may be sufficient that surface tension of liquid positioned between the apertures and the mesh on the acoustic port does not trap the liquid in place. As such, the distance between the apertures may allow liquid that enters the apertures to exit and/or not prevent the liquid from exiting.

In some implementations, the mesh may resist the passage of liquid absent pressure but may pass liquid under pressure and/or under sufficient pressure. This may further mitigate potential liquid damage to the mesh and/or internal acoustic device components. In various implementations, the mesh may be formed of a sheet of material (such as metal, stainless steel, and/or any other material) with multiple perforations that are oriented in a number of different directions. Such perforations may be formed by laser perforation and/or other suitable processes.

In various implementations, one or more hydrophobic and/or hydrophilic coatings may be located on a surface of the mesh (such as the surface facing the umbrella section), an internal area of the housing (such as internal areas of the apertures, internal surfaces of the umbrella section, internal areas of the housing positioned between the apertures and the mesh, and so on), and so on. For example, a hydrophobic coating may be applied to the surface of the mesh facing the umbrella section to further resist entry of liquid into the acoustic port and a hydrophilic coating may be applied to the opposite surface of the mesh to draw back out any liquid that does manage to enter the acoustic port.

In one or more implementations, an additional mesh and/or other structure that resists entry of liquid and/or other materials into the acoustic device may cover the apertures. Such an additional mesh may be positioned on an external surface of the housing, an internal surface of the housing, and/or within the apertures. Such additional mesh may further reduce pressure of liquid entering the apertures on the mesh covering the acoustic port. In some cases, one or more surfaces of such an additional mesh may include one or more hydrophobic and/or hydrophilic coatings. In various cases, the additional mesh may be composed of a different material than the mesh covering the acoustic port. Such different material may be configured with a cosmetic appearance, resist/allow the passage of liquid differently than the mesh covering the acoustic port, and/or perform other functions differently due to formation from the different material.

In some implementations, the acoustic device may be configured such that an acoustic membrane of the acoustic device is oriented toward the acoustic port, and thusly oriented toward the mesh and the umbrella section as well. Such an orientation may aid the acoustic device in driving out liquid that enters the apertures, such as by producing one or more tones using the acoustic membrane and/or by various other techniques.

FIG. 1 is an isometric view illustrating an example system 100 for a liquid resistant acoustic device. The system 100 includes an electronic device 101 with an acoustic portion 102. As illustrated, the electronic device is shown as a tablet computing device. However, it is understood that this is an example and in various implementations the electronic device may be any kind of device such as a desktop computing device, a laptop computing device, a mobile computing device, a wearable device, a cellular telephone, a smart phone, a digital media player, and/or any other kind of electronic device.

Figure 2:
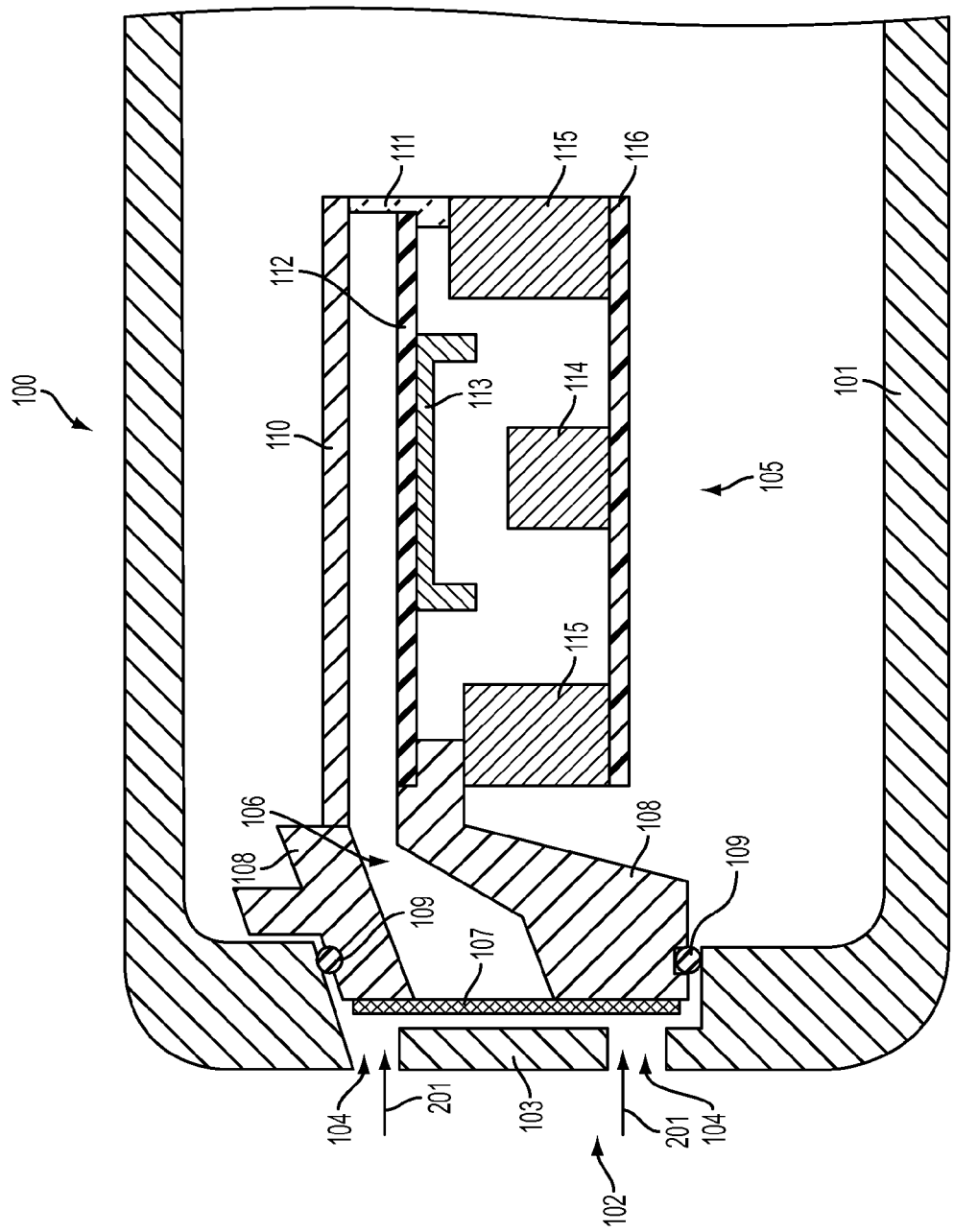
FIG. 2 is a cross sectional view of the example system of FIG. 1 taken along line 2-2 of FIG. 1.

As also illustrated, the acoustic portion 102 includes a number of apertures 104 (or openings) that are separated by an "umbrella" housing section 103 (named as such because of the covering function it performs with respect to the acoustic port 106 shown in FIG. 2) of the housing of the electronic device 101.

FIG. 2 is a cross sectional view of the example 100 system of FIG. 1 taken along line 2-2 of FIG. 1. The electronic device 101 may include an acoustic device 105 that may be coupled to the electronic device via a mechanism such as o-ring 109.

As also illustrated, the acoustic device 105 may include an acoustic port 106 that is covered by a mesh 107 and/or other structure that resists entry of liquid and/or other materials into the acoustic device. The umbrella housing section 103 may be configured such that the umbrella housing section covers the acoustic port. As shown, the umbrella housing section may be configured to be wider than the acoustic port in order for the umbrella housing section to entirely cover the acoustic port.

When liquid enters through one or more of the apertures 104, the umbrella housing section 103 may direct the flow 201 of the liquid away from a portion of the mesh 107 covering the acoustic port 106 and/or the acoustic port. This direction of the flow may reduce pressure of the flow on the mesh, mitigating potential damage to the mesh and/or internal acoustic device 105 components from the pressure and/or the liquid.

The mesh 107 may be configured to resist the passage of the liquid. However, the mesh may be configured to pass the liquid under pressure and/or under sufficient pressure, such as the pressure of the flow 201 had not the pressure of the flow upon the mesh been reduced by the umbrella housing portion 103. Such a configuration may further mitigate potential liquid damage to the mesh and/or internal acoustic device components.

In various implementations, the mesh may be formed of a sheet of material with multiple perforations (such as microscopic perforations and/or other kinds of perforations) that are oriented in a number of different directions. In various cases, the material may be metal, stainless steel, and/or any other material. The perforations may be formed by laser perforation and/or other suitable processes.

As illustrated, the separation of the apertures 104 by the umbrella housing portion 103 may position the apertures a distance apart. This distance may be configured to be sufficient that surface tension of any liquid that is positioned between the apertures and the mesh 107 does not prevent the such liquid from exiting through and/or allows such liquid to exit through one or more of the apertures.

As illustrated, the acoustic device 105 is shown as a speaker. As shown, the speaker may include a coupling portion 108 that defines the acoustic port 106, a cover 110, a support 111 that cooperates with the coupling portion to support an acoustic membrane 112, a voice coil 113 coupled to the acoustic membrane, center magnet 114, side magnets 115, and yoke 116. The speaker may operate by directing magnetic flux utilizing the center magnet, side magnets, and/or yoke to move the voice coil. Movement of the voice coil may vibrate the acoustic membrane, producing sound waves that may be directed toward the acoustic port and out of the electronic device 101 through one or more of the apertures.

However, though the acoustic device 105 is shown and described as a speaker with particular components arranged in a particular configuration, it is understood that this is an example. In various implementations, the acoustic device may be any kind of microphone, speaker, MEMS microphone, MEMS speaker, and/or any other acoustic device.

As shown and described above, the umbrella housing section 103 is a portion of the housing of the electronic device 101. However, it is understood that this is an example. In various implementations, the umbrella section may be a component separate from the housing and/or formed of a different material from the housing without departing from the scope of the present disclosure.

Figure 3:
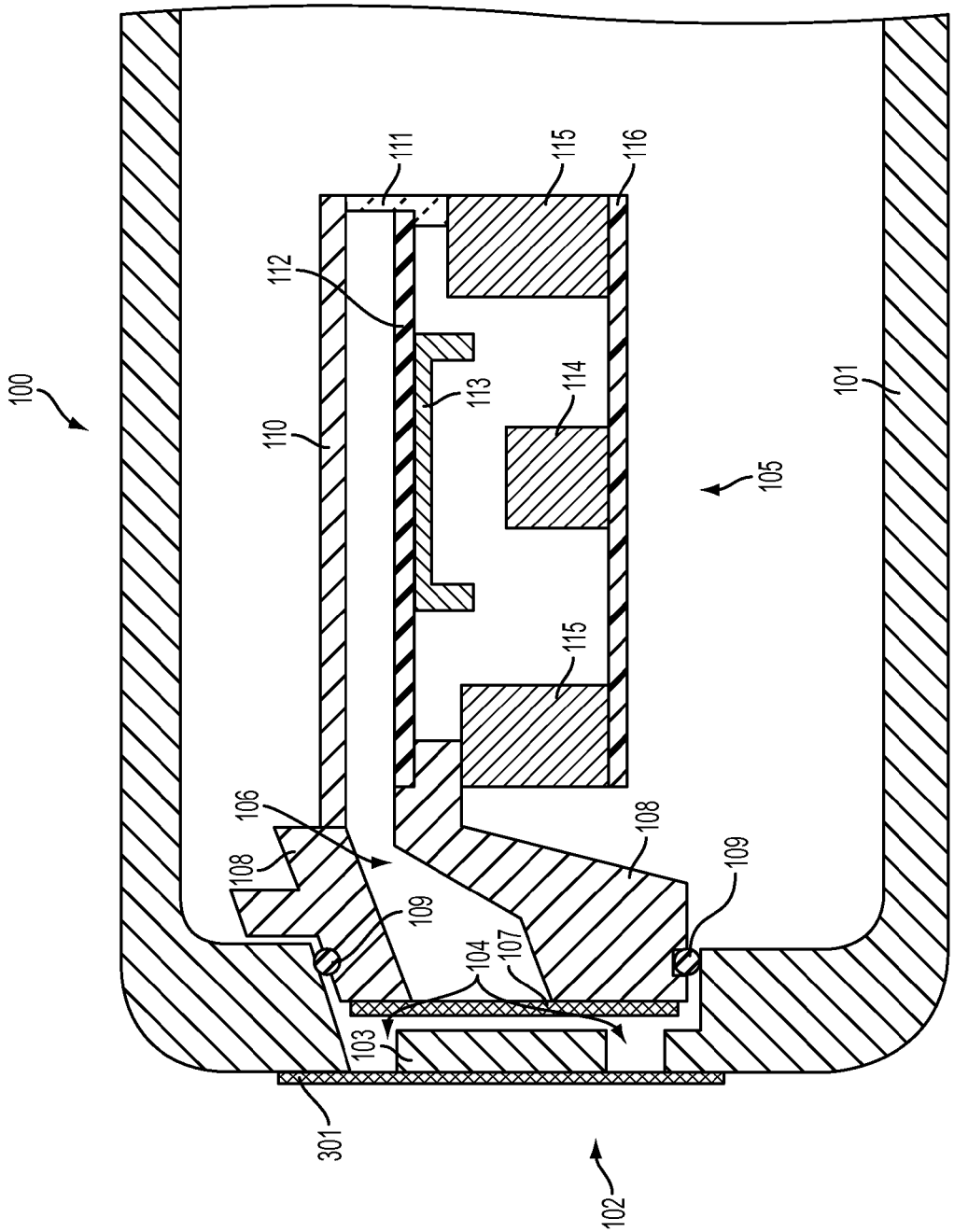
FIG. 3 is a first alternative implementation of the cross sectional view of FIG. 2.

FIG. 3 is a first alternative implementation of the cross sectional view of the system 100 of FIG. 2. As illustrated, by way of contrast with the system 100 of FIG. 2, an additional mesh 301 and/or other structure that resists entry of liquid and/or other materials into the acoustic device may cover one or more of the apertures 104. This additional mesh may further reduce pressure of any liquid entering the apertures on the mesh 107.

As illustrated, the additional mesh 301 is positioned on the outside of the housing of the electronic device 101. However, it is understood that this is an example. In various implementations, the additional mesh may be positioned on an internal portion of the housing, within one or more of the apertures, and/or otherwise positioned without departing from the scope of the present disclosure.

The additional mesh 301 may be composed of the same material as the mesh 107 and/or a different material. Such different material may be associated with a different function performed by the additional mesh than the mesh. Such different function may include cosmetic appearance, different resistance/allowance of the passage of liquid than the mesh, and/or other such functions.

For example, the additional mesh 301 may be formed of a material more resistant to corrosion (and in some cases less resistant to tearing) than the mesh as the additional mesh may be visible outside the electronic device 101 whereas the mesh may not be and corrosion not affecting function may not be noticeable.

Figure 4:
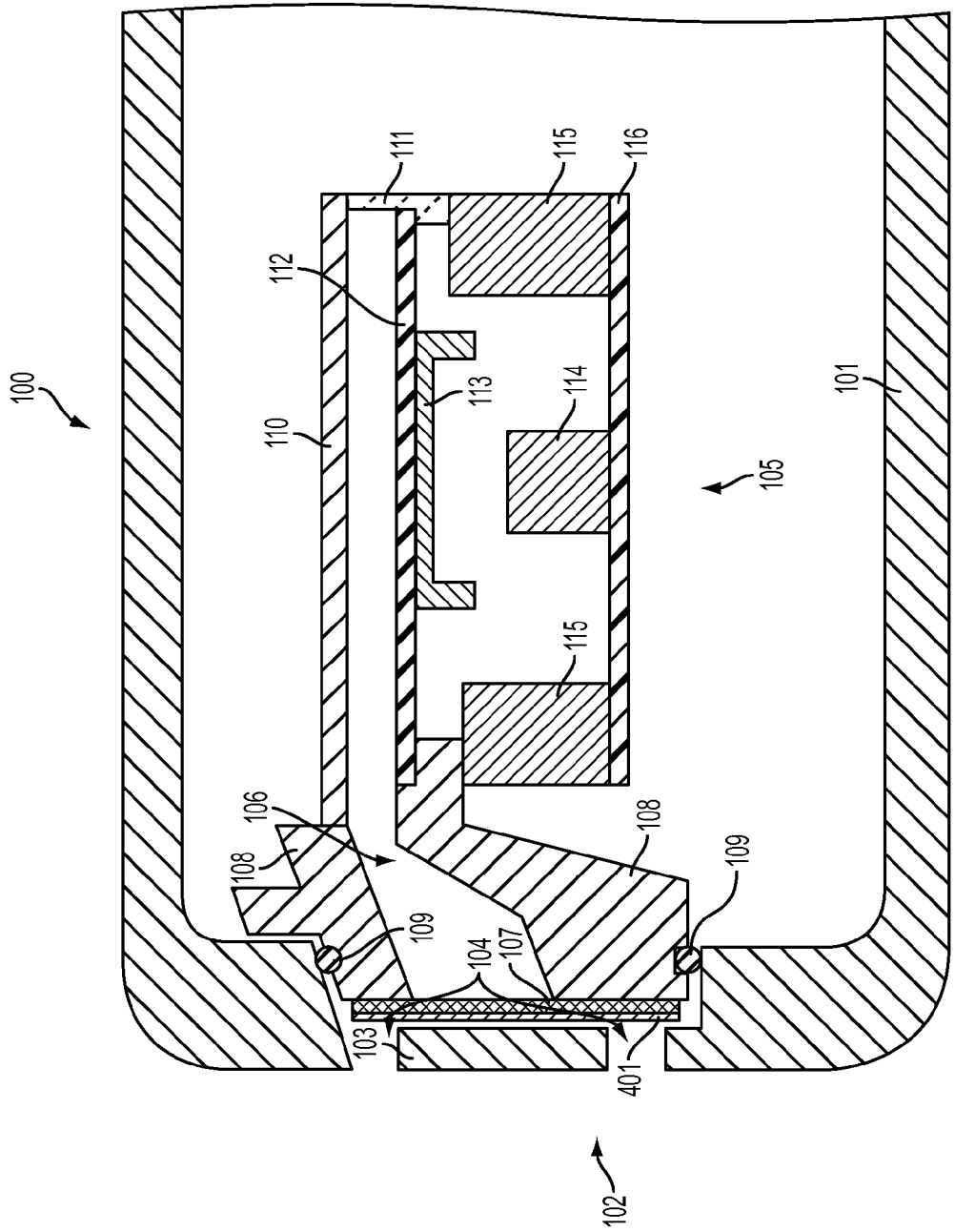
FIG. 4 is a second alternative implementation of the cross sectional view of FIG. 2.

FIG. 4 is a second alternative implementation of the cross sectional view of the system 100 of FIG. 2. As illustrated, by way of contrast with the system 100 of FIG. 2, one or more hydrophobic and/or hydrophilic coatings 401 may be located on one or more surfaces of the system.

As illustrated, the coating 401 may be a hydrophobic coating on a surface of the mesh 107 facing the apertures 104. A hydrophobic coating so positioned may further resist entry of liquid into the acoustic device 105. However, it is understood that this is an example and that one or more hydrophobic and/or hydrophilic coatings may be positioned in a variety of locations (such as other surfaces of the mesh and/or various surfaces of the additional mesh 301 of FIG. 3; an internal area of the housing such as internal areas of the apertures, internal surfaces of the umbrella section, internal areas of the housing positioned between the apertures and the mesh, and so on; and/or other such locations) without departing from the scope of the present disclosure.

For example, a hydrophobic coating may be applied to an outer surface of the additional mesh 301 of FIG. 3 to further resist entry of liquid into one or more of the apertures 104 and a hydrophilic coating may be applied to the inner surface of the additional mesh to draw back out any liquid that does manage to enter an aperture.

By way of another example, a hydrophobic coating may be applied to internal areas of the housing of the electronic device 101 between the apertures 104 and the mesh 107 so that any liquid that does enter through one or more of the apertures exits back through one or more of the apertures more easily.

Figure 5:
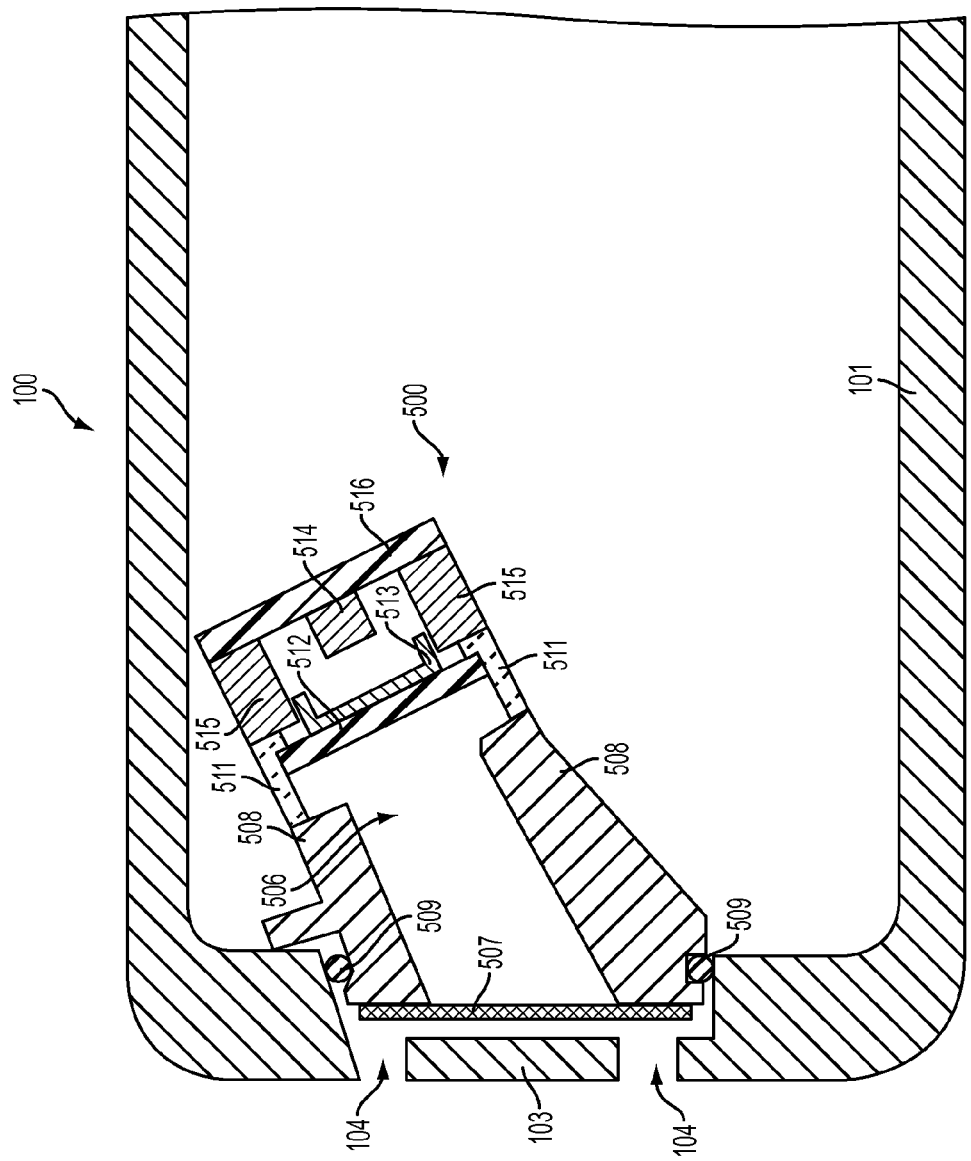
FIG. 5 is a third alternative implementation of the cross sectional view of FIG. 2.

FIG. 5 is a third alternative implementation of the cross sectional view of the system 100 of FIG. 2. As illustrated, by way of contrast with the system 100 of FIG. 2, the acoustic device 505 (including elements 506-516) may be directly coupled by a coupling portion 508 to the housing of the electronic device 101 via a mechanism such as the o-ring 509 so that an acoustic membrane 512 (and/or one or more other components of the acoustic device 500) is oriented toward the acoustic port 506. This "side orientation" of the acoustic device may enable the acoustic device to be configured to drive liquid positioned between the apertures 104 and the mesh 507 out one or more of the apertures.

For example, directly orienting the acoustic membrane 512 directly toward the acoustic port 506 may enable sound waves produced by vibrating the acoustic membrane to more effectively drive liquid that is present out of the acoustic port and/or the apertures 104. As such, the acoustic device 505 may produce one or more tones in various implementations to drive liquid out of the acoustic device and/or the electronic device 101.

However, it is understood that use of the acoustic membrane 512 to produce one or more tones to drive out liquid is an example. In various implementations, one or more other techniques may be utilized to remove liquid from the acoustic device 505 and/or the electronic device 101 without departing from the scope of the present disclosure. For example, one or more heating elements may be utilized to remove such liquid in various cases.

Figure 6:
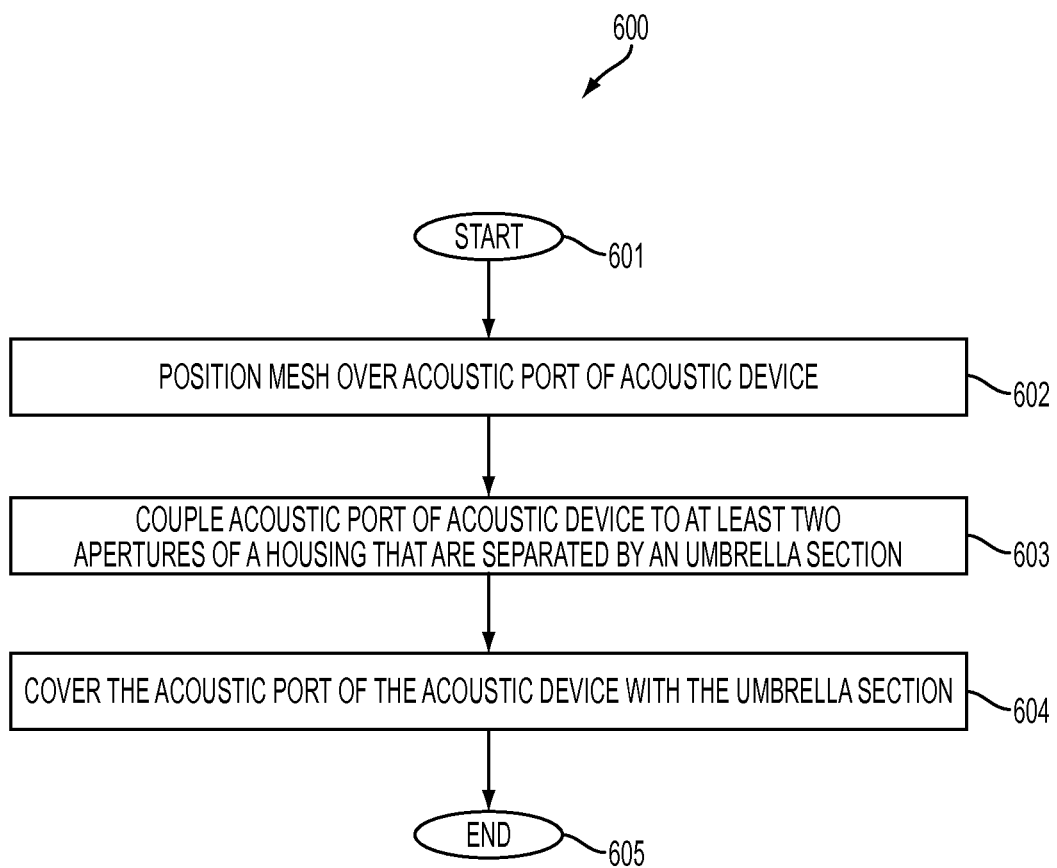
FIG. 6 is a flow chart illustrating an example method for assembling a liquid resistant acoustic device. Such an assembled liquid resistant acoustic device may be the acoustic devices 105 and/or 505 of the systems of FIGS. 1-5.

FIG. 6 is a flow chart illustrating an example method 600 for assembling a liquid resistant acoustic device. Such an assembled liquid resistant acoustic device may be the acoustic devices 105 and/or 505 of the systems of FIGS. 1-5.

The flow may begin at block 601 and proceed to block 602 where a mesh and/or other structure that resists entry of liquid and/or other materials into an acoustic device may be positioned over an acoustic port of the acoustic device such as a microphone or speaker. The flow may then proceed to block 603 where the acoustic port of the acoustic device may be coupled to at least two apertures or openings of a housing. The apertures may be separated by an umbrella section. Next, the flow may proceed to block 604 where the acoustic port of the acoustic device is covered with the umbrella section. Finally, the flow may proceed to block 605 and end.

Although the example method 600 is illustrated and described as including particular operations performed in a particular order, it is understood that this is an example. In various implementations, various orders of the same, similar, and/or different operations may be performed without departing from the scope of the present disclosure.

For example, blocks 603 and 604 are shown and described as separate, linear operations. However, in various implementations the acoustic port may be coupled to the apertures and covered by the umbrella portion as part of a single, unitary operation. In other implementations, such operations may be separate, discrete operations that are simultaneously performed.

By way of another example, in some implementations the method 600 may include the additional operation of applying one or more hydrophobic and/or hydrophilic coatings to one or more surfaces of the mesh, the housing, the apertures, the acoustic port, and/or the acoustic device. Such hydrophobic and/or hydrophilic coatings may resist entry of liquids and/or aid in the ejection of liquids that do enter.

Figure 7:
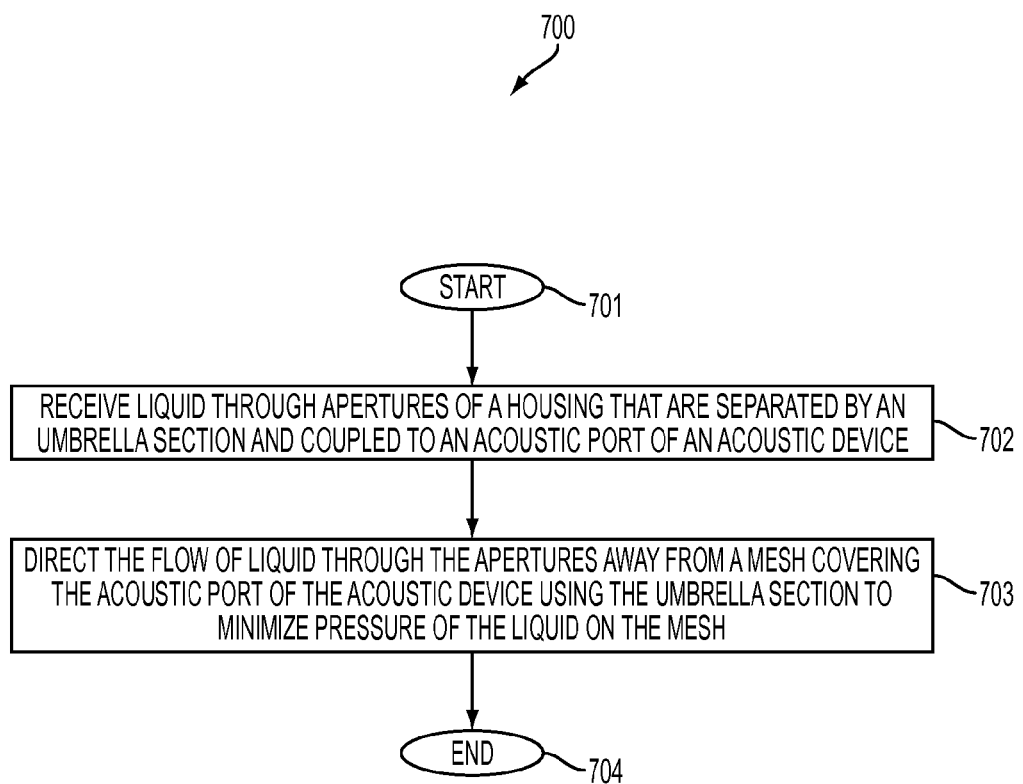
FIG. 7 is a flow chart illustrating an example method for operating a liquid resistant acoustic device. This method may be performed by the systems of FIGS. 1-5.

FIG. 7 is a flow chart illustrating an example method 700 for operating a liquid resistant acoustic device. This method may be performed by the systems of FIGS. 1-5.

The flow may begin at block 701 and proceed to block 702 where liquid is received through apertures or openings of a housing that are separated by an umbrella section and coupled to an acoustic port of an acoustic device such as a microphone or speaker. The flow may then proceed to block 703 where the flow of the liquid through the apertures or openings is directed away from a portion of a mesh and/or other structure that resists entry of liquid and/or other materials into the acoustic device covering the acoustic port and/or the acoustic port of the acoustic device utilizing the umbrella section. Such direction of the flow may minimize and/or reduce pressure of the liquid on the mesh. Next, the flow may proceed to block 704 and end.

Although the example method 700 is illustrated and described as including particular operations performed in a particular order, it is understood that this is an example. In various implementations, various orders of the same, similar, and/or different operations may be performed without departing from the scope of the present disclosure.

For example, blocks 702 and 703 are shown and described as separate, linear operations. However, in various implementations the liquid may be received and the flow of such may be directed by the umbrella section as part of a single, unitary operation. In other implementations, such operations may be separate, discrete operations that are simultaneously performed.

By way of another example, in some implementations the method 700 may include the additional operation of producing one or more tones to drive the liquid back through one or more of the apertures. Such tones may be produced in some cases utilizing an acoustic membrane of the acoustic device.

As described above and illustrated in the accompanying figures, the present disclosure discloses systems, method, and apparatuses for a liquid resistant acoustic device. An acoustic port of acoustic device may be covered with a mesh and/or other structure that resists entry of liquid and/or other materials into the acoustic device. Apertures of a housing that may be separated by an umbrella section may be coupled to the acoustic port such that the umbrella section may cover the acoustic port. In this way, when liquid enters one or more of the apertures, the umbrella section may direct the liquid away from the mesh such that pressure from the liquid upon the mesh may be reduced. As such, potential damage to the mesh and/or internal acoustic device components may be mitigated.

In the present disclosure, the methods disclosed may be implemented utilizing sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Techniques utilizing methods described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for a liquid resistant acoustic device, comprising:
   an acoustic device comprising:
      an acoustic port; and
      a structure covering the acoustic port that resists entry of liquid or other materials into the acoustic device; and
   a housing comprising:
      an umbrella housing section;
      a hydrophilic coating on a portion of the umbrella housing section facing the structure; and
      at least two apertures separated by the umbrella housing section that couple to the acoustic port of the acoustic device, the at least two apertures being coated with a hydrophobic coating; and an additional structure that resists entry of liquid or other materials into the acoustic device, that covers the at least two apertures, and is positioned on at least one of an external surface of the housing or an internal surface of the housing;

wherein the umbrella housing section covers the acoustic port.

2. The system of claim 1, wherein when liquid enters one or more of the at least two apertures the umbrella housing section directs flow of the liquid away from the acoustic port.

3. The system of claim 2, wherein the direction of the flow of the liquid away from the acoustic port reduces pressure on the structure.

4. The system of claim 1, wherein the umbrella housing section is wider than the acoustic port.

5. The system of claim 1, wherein the additional structure is composed of a different material than the structure.

6. The system of claim 1, wherein a surface of the structure facing the umbrella housing section includes a hydrophobic coating.

7. The system of claim 1, wherein the portion of the umbrella housing section is an internal area of the housing between the at least two apertures and the acoustic port.

8. The system of claim 7, wherein the internal area comprises at least one of an internal surface of the umbrella housing section or an internal surface of the at least two apertures.

9. The system of claim 1, wherein a distance between the at least two apertures is sufficient that liquid positioned between the at least two apertures and the structure is allowed to exit through one or more of the at least two apertures.

10. The system of claim 1, wherein a distance between the at least two apertures is sufficient that surface tension of liquid positioned between the at least two apertures and the structure does not prevent the liquid from exiting through one or more of the at least two apertures.

11. The system of claim 1, wherein the structure allows liquid to pass under pressure.

12. The system of claim 1, wherein the acoustic device is configured such that an acoustic membrane of the acoustic device is oriented toward the acoustic port.

13. The system of claim 12, wherein the acoustic device is configured to drive liquid positioned between the structure and the at least two apertures out one or more of the at least two apertures.

14. The system of claim 1, wherein the structure comprises a single sheet of material with multiple perforations that extend through the single sheet of material and are oriented in a number of directions.

15. The system of claim 14, wherein the perforations are formed by laser perforation.

16. The system of claim 1, wherein the acoustic device comprises at least one of a microphone, a speaker, a microelectromechanical systems microphone, or a microelectromechanical systems speaker.

17. The system of claim 1, wherein the structure comprises a mesh.

18. An electronic device, comprising:
    an acoustic device comprising:
        an acoustic port; and
        a structure positioned over the acoustic port that resists entry of liquid or other materials into the acoustic device, the structure comprising a single sheet of material with multiple perforations extending through the single sheet of material that are oriented in a number of directions; and
    a housing comprising:
        an umbrella section; and
        at least two openings separated by the umbrella section that couple to the acoustic port of the acoustic device; and
    an additional structure that resists entry of liquid or other materials into the acoustic device, that covers the at least two openings, and is positioned on at least one of an external surface of the housing or an internal surface of the housing;

wherein the umbrella section covers the acoustic port.

19. A method for assembling a liquid resistant acoustic device, comprising:
    positioning a structure over an acoustic port of an acoustic device that resists entry of liquid or other materials into the acoustic device, the structure comprising a single sheet of material with multiple perforations extending through the single sheet of material that are oriented in a number of directions;
    coupling the acoustic port to at least two apertures of a housing that are separated by an umbrella section;
    covering the acoustic port with the umbrella section; and
    positioning an additional structure to cover the at least two apertures on at least one of an external surface of the housing or an internal surface of the housing, the additional structure resists entry of liquid or other materials into the acoustic device.

* * * * *